United States Patent
Baclawski (10) Patent No.: US 6,470,333 B1
(45) Date of Patent: Oct. 22, 2002

(54) KNOWLEDGE EXTRACTION SYSTEM AND METHOD

(75) Inventor: Kenneth P. Baclawski, Waltham, MA (US)

(73) Assignee: Jarg Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,276

(22) Filed: Jul. 26, 1999

Related U.S. Application Data (60) Provisional application No. 60/094,350, filed on Jul. 28, 1998, and provisional application No. 60/094,110, filed on Jul. 24, 1998.

(51) Int. Cl.⁷ .............................................. G06F 17/30
(52) U.S. Cl. ...................... 707/3; 707/4; 707/5; 707/6; 707/10; 707/103; 707/104
(58) Field of Search ............................... 707/10, 104, 3, 707/103, 4, 6, 100, 101; 709/217, 218, 229, 219; 705/52, 54; 706/12

(56) References Cited

U.S. PATENT DOCUMENTS

| | | |
|---|---|---|
| 5,226,176 A | 7/1993 | Westaway et al. |
| 5,537,467 A | 7/1996 | Cheng et al. |

(List continued on next page.)

FOREIGN PATENT DOCUMENTS

| | | |
|---|---|---|
| EP | 0882503 A | 2/1998 |

OTHER PUBLICATIONS

Santini, et al.; "Similarity Queries In Image Databases"; Proceedings 1996 IEEE Computer Society Conference on Computer Vision and Pattern Recogniation (Cat. No. 96CB35909), Proceedings of IEEE Conference on Computer Vision and Pattern Recognition, San Francisco, CA, USA; Jun. 18–20, 1996; pp. 646–651; XP002127209; 1996, Los Alamitos, CA, USA, IEEE Computer Society Press, USA ISBN: 0–8186–7258–7 *Section 2.1.2*.

Salton, Gerard et al., "Automatic Structuring And Retrieval Of Large Text Files", Communications Of The ACM, Feb. 1994, pp. 97–108, vol. 37, No. 2.

(List continued on next page.)

*Primary Examiner*—Jean M. Corrielus
(74) *Attorney, Agent, or Firm*—Kudirka & Jobse, LLP (57) ABSTRACT

An information retrieval apparatus for processing a query for retrieval of information from a database has a mechanism for locating a number of features and feature fragments in an index database; an evaluating mechanism for identifying a number of sub-queries of a number of levels contained in the query and recursively evaluating the sub-queries using each of the located features and feature fragments; and a mechanism for collecting and storing a number of results of the recursive evaluation of the query and sub-queries pursuant to computing an overall result of the query. Such a system can eliminate the need of conventional retrieval systems for providing a new, separate, centralized replica within the data warehouse of the data stored in the diverse external databases. The invention can thus avoid the problems of replication of such data in conventional systems, in which the data may become stale or is subject to errors arising during replication for warehousing. Instead, the data warehouse can contain an index database, which stores entries providing data regarding the information stored in the external databases, such as information location specifiers for that data within those databases, relational information and statistics. The invention can also provide a robust, versatile indexing system.

17 Claims, 8 Drawing Sheets

U.S. PATENT DOCUMENTS

| | | | |
|---|---|---|---|
| 5,647,058 | A | 7/1997 | Agrawal et al. |
| 5,655,080 | A | 8/1997 | Dias et al. |
| 5,694,593 | A | 12/1997 | Baclawski |
| 5,727,950 | A | 3/1998 | Cook et al. |
| 5,794,210 | A | 8/1998 | Goldhaber et al. |
| 5,809,492 | A | 9/1998 | Murray et al. |
| 5,819,243 | A | 10/1998 | Rich et al. |
| 5,855,008 | A | 12/1998 | Goldhaber et al. |
| 5,926,551 | A | 7/1999 | Dwork et al. |
| 5,931,907 | A | 8/1999 | Davies et al. |
| 5,936,547 | A | 8/1999 | Lund |
| 5,953,726 | A | 9/1999 | Carter et al. |

OTHER PUBLICATIONS

Chakrabarti, Soumen, et al., "Automatic Resource Compilaton by Analyzing Hyperlink Structure and Associated Text", Proceedings 7th International World Wide Web Conference, 1998, <http://decweb.ethz.ch/WWW7/1898/com1898.htm>.

Jain, Ranesh, "Content–Centric Computing in Visual Systems", in DEL BIMBO, Alberto, "Image Analysis and Processing", Lecture Notes in Computer Science, 9th International Conference ICIAP '97, Sep., 1997, pp. 1–31, Proceedings, vol. II, Florence, Italy.

Pirolli, Peter et al., "Silk from a Sow's Ear: Extracting Usuable Structures From the Web", CHI 96, Apr. 13–18, 1996, pp. 118–125, Vancouver, Canada.

Kleinberg, Jon, "Authoritative Sources in Hyperlinked Environment", Proceedings 9th ACM–SIAM Symposium on Discrete Algorithms, 1998, <http://www.cs.cornell.edu/home/kleinber/auth.pdf>.

Gibson, David et al, "Inferring Web Communities from Link Topology", Proceedings 9th ACM Conference on Hypertext and Hypermedia, 1998, <http://www.cs.cornell.edu/home/kleinber/ht98.pdf>.

Arocena, Gustavo et al., "Applications of a Web Query Language", HYPER Proceedings, Sixth International World Wide Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communcations Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", HYPER Proceedings, Sixth International World Wide Conference, <http://decweb.ethz.ch/WWW6/Technical/Paper206/Paper206.html>.

NOY, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta, Yuichi, "Knowledge–Based Inerpretation of Outdoor Natural Color Scenes", Institute of Information Sciences and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996, pp. 652–664.

Santini, Simone, et al., "Image Databases Are Not Databases With Images", in DELBIMBO, Alberto, "Image Analysis and Processing", Lecture Notes in Computer Science, 9th Inernational Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retreval of Information by Computer, 1989, pp. 275–366, Addison–Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predictive Data Mining, A Practical Guide, Morgan Kaufmann Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer Science, Boston, MA Mar. 30, 1994.

Giger, H.P., "Concept Based Retrieval in Classical IR Systems", Proceedings of the International Conference on Research and Development in Information Retrieval, NY, NY, ACM, vol. CONF. 11, pp. 275–289.

WAREHOUSE MESSAGE

*Figure 4a*

WAREHOUSE RESPONSE MESSAGE

*Figure 4b*

INSERT MESSAGE

*Figure 4c*

SUB-QUERY MESSAGE

Figure 4d

SUB-QUERY RESPONSE MESSAGE

KNOWLEDGE EXTRACTION SYSTEM AND METHOD

RELATED APPLICATIONS

This application is related to and claims priority from commonly assigned U.S. Provisional Application, Ser. No. 60/094,350, filed Jul. 28, 1998 now abandoned by Kenneth P. Baclawski, and entitled "Knowledge Extraction System and Method; and Ser. No. 60/094,110, filed Jul. 24, 1998 by Kenneth P. Baclawski, and entitled "Distributed Object Search System and Method"; the disclosures of which are incorporated herein by reference. This application is also related to copending, commonly assigned U.S. Application, Ser. No. 09/509,328, filed on even date herewith by Kenneth P. Baclawski, and entitled "Distributed Computer Database System And Method For Performing Object Search", the disclosure of which is incorporated herein by reference.

FIELD OF THE INVENTION

The invention relates to computer database systems and more specifically to distributed computer database systems.

BACKGROUND OF THE INVENTION

Organizations routinely collect large amounts of data on their customers, products, operations and business activities. Insights buried in this data can contribute to marketing, reducing operating costs and strategic decision-making. For example, if there is a strong correlation between the customers who buy one product with those who buy another product, then those customers who have bought just one of them might be good prospects for buying the other product.

Analytical processing of data is primarily done using statistical methods to extract correlations and other patterns in the data. This kind of processing has been variously called data mining, knowledge discovery and knowledge extraction. A search for a specific pattern or kind of pattern in a large collection of data will be called a pattern query.

Large enterprises typically maintain many databases, many of which are transactional databases. The requirements of these databases are often in conflict with the requirements of data mining. Transactional databases are updated using small transactions operating in real time. Data mining, on the other hand, uses large pattern queries that do not have to take place in real time. To resolve this conflict, it is now common for data from a variety of sources to be downloaded to a centralized resource called a data warehouse.

The downloading and centralizing of data from diverse, often disparate sources requires a number of tasks. The data must be extracted from the sources, transformed to a common, integrated data model, cleansed to eliminate or correct erroneous or inaccurate data and integrated into the central warehouse constituting yet another it database in which all the data is stored. In addition, one must ensure that every instance of every business entity, such as a customer, product or employee, has been correctly identified. This is known as the problem of referential integrity. All of these are difficult tasks, especially ensuring referential integrity when the data is being downloaded from databases that identify the business entities in slightly different ways. Current technology downloads data to the data warehouse as an independent activity. from data mining. In contrast with data mining, for which there is a large research literature and many commercial products, data warehousing does not have a strong theoretical basis and has few good commercial products.

Because data warehouses integrate many diverse data sources, it is necessary to specify an integrated data model for the data warehouse as well as a data mapping that extracts, transforms and cleanses data from each data source. It is known in the art that richer data models, such as object-oriented data models, are better suited for defining such an integrated data model and for defining the data mappings, than more limited data models, such as the relational model. Yet most data warehouses still use a flat record structure such as the relational model. Relational databases have a very limited data structure, so that synthesizing more complex data structures is awkward and error-prone. Some of the kinds of data that are poorly suited to storage in a relational database include: textual data in general, hypertext documents in particular, images, sound, multimedia objects and multi-valued attributes. Relational databases are also poorly suited for representing records that have a very large number of potential attributes, only a few of which are used by any given record.

An object database consists typically of a collection of data or information objects. Each information object is identified uniquely by an object identifier (OID). Each information object can have features, and some features can have associated values. Information objects can also contain or refer to other information objects.

To assist in finding information in a database, including the warehousing database, special search structures are employed called indexes. Large databases require correspondingly large index structures to maintain pointers to the stored data. Such an index structure can be larger than the database itself. Current technology requires a separate index for each attribute or feature. This technology can be extended to allow for indexing a small number of attributes or features in a single index structure, but this technology does not function well when there are hundreds or thousands of attributes. Furthermore, there is considerable overhead associated with maintaining an index structure. This limits the number of attributes or features that can be indexed, so the ones that are supported must be chosen carefully. For transactional databases, the workload is usually well understood, so it is possible to choose the indexes so as to optimize the performance of the database. For a data warehouse, there is usually no well defined workload, so it is much more difficult to choose which attributes to index.

Further information can be had regarding the foregoing concepts with reference to the following publications:

1 L. Aiello, J. Doyle, and S. Shapiro, editors. *Proc. Fifth Intern. Conf. on Principles of Knowledge Representation and Reasoning*. Morgan Kaufman Publishers, San Mateo, Cali., 1996.

2 K. Baclawski. Distributed computer database system and method, December 1997. U.S. Pat. No. 5,694,593. Assigned to Northeastern University, Boston, Mass.

3 A. Del Bimbo, editor. *The Ninth International Conference on Image Analysis and Processing*, volume 1311. Springer, September 1997.

4 N. Fridman Noy. *Knowledge Representation for Intelligent Information Retrieval in Experimental Sciences*. PhD thesis, College of Computer Science, Northeastern University, Boston, Mass., 1997.

5 M. Hurwicz. Take your data to the cleaners. Byte Magazine, January 1997.

6 Y. Ohta. *Knowledge-Based Interpretation of Outdoor Natural Color Scenes*. Pitman, Boston, Mass., 1985.

7 A. Tversky. Features of similarity. *Psycho ogical review*, 84(4):327–352, July 1977.

8 S. Weiss and N. Indurkhya. *Predictive Data Mining: A Practical Guide*. Morgan Kaufmann Publishers, Inc., San Francisco, Cali., 1998.

9 J.-L. Weldon and A. Joch. Data warehouse building blocks. Byte Magazine, January 1997.

The disclosures of the publications referenced in this "Background of the Invention" are incorporated herein by reference.

It would be desirable to provide improved systems for data warehousing and-data mining, which overcomes many-of the performance and other problems and limitations of current systems.

SUMMARY OF THE INVENTION

The present invention combines the two activities of data warehousing and data mining, thereby improving the basis and support for data warehousing. The term knowledge extraction will be used herein for the integration of the data warehousing and data mining activities.

The invention resides in an information retrieval apparatus and method for processing a query from a user, including, e.g., a query, for retrieval of information from the data warehouse. The apparatus includes a mechanism for locating a number of features and feature fragments in an index database; an evaluating mechanism for identifying a number of sub-queries of a number of levels contained in the query and recursively evaluating the sub-queries using each of the located features and feature fragments; and a mechanism for collecting and storing a number of results of the recursive evaluation of the query and sub-queries pursuant to computing an overall result of the query.

As used herein, "evaluation" is a process by which a response to a query is generated, characterized by retrieval of information, information location specifiers, or data regarding the information, which match criteria set forth in the query. Recursive it evaluation is a type of query evaluation in which new queries, called sub-queries, are generated from the query and evaluated. The sub-queries so generated can be regarded as nodes in a query tree, with the original query as a base node, and each sub-query having a corresponding level within the tree defined by its relationship with predecessor queries from which it was generated. All of the sub-queries, i.e., predecessor queries and child queries, are evaluated recursively, and the results collected, stored, and provided to the user in response to the query.

The invention can eliminate the need in conventional retrieval systems for providing a new, separate, centralized replica within the data warehouse of the data in the diverse external databases. The invention can thus avoid the problems of replication of such data in conventional systems, in which the data may become stale or is subject to errors arising during replication for warehousing. Instead, the data warehouse can contain an index database, which stores entries providing data regarding the information stored in the external databases, such as information location specifiers for that data within those databases, relational information and statistics. The invention can also provide a robust, versatile indexing system. The index of the invention supports, e.g., indexing of sparse records that have large numbers of potential attributes, only a few of which are used in a particular record. The present invention also supports, e.g., indexing of very large numbers of attributes in a substantially uniform data structure, making it much easier to determine the workload characteristics necessary for achieving high performance.

More specifically, according to an-aspect of the invention, a distributed computer database system includes one or more front end computers and one or more computer nodes interconnected by a network into a data warehouse and data mining engine, which indexes objects including images, sound and video streams, as well as plain and structured text. An object from an external database is downloaded from the network by a node, termed the warehousing node. The warehousing node extracts some features from the object, fragments each of the extracted features into a number of feature fragments, and hashes these features fragments. Each hashed feature fragment is transmitted to one node on the network, called an index node. Each node on the network that receives a hashed feature fragment uses the hashed feature fragment of the object to perform a search on its respective partition of the index database. The results of the searches of the local databases are gathered by the warehousing node. The warehousing node uses these results to determine whether the object has already been indexed in the data warehouse. The warehousing node then extracts the features from the object, fragments the features, and hashes these feature fragments. Each hashed feature fragment is transmitted to one node on the network. Each node on the network that receives a hashed feature fragment uses the hashed feature fragment of the object to store the feature in its respective partition of the index database.

The query can be, for example, a pattern query. A pattern query is a search for a pattern in the data. A pattern query from a user is transmitted to one of the front end computers which forwards the pattern query to one of the index nodes, termed the home node, of the data mining engine. The home node-decomposes the pattern query into one or more sub-queries, each sub-query being stored in memory and including an object feature and a computer-executable program implementing a method, e.g., a computation. The computation may involve additional sub-queries. The home node fragments each of the sub-query features into one or more sub-query feature fragments and then hashes the feature fragments. Each sub-query feature fragment is transmitted to one node on the network, according to the hashed feature fragment. Each node on the network that receives a sub-query uses the hashed feature fragment of the sub-query to perform a search on its respective partition of the index database, and the accessed data is used by the computation of the sub-query. If the computation of a sub-query contains additional sub-queries (and it may contain zero, one or more sub-queries), then the additional sub-queries are evaluated recursively, and the data obtained by the recursive evaluation is used by the computation of the sub-query. The results of the searches of the local index databases and the results of any recursive evaluations are gathered by the home node. The results of the pattern query are determined by the home node and returned to the user.

In another aspect of the invention, a distributed computer database system includes one or more front end computers and one or more computer nodes interconnected by a network to operate as a knowledge extraction engine, which supports both the data warehousing activity and the data mining activity.

First consider the data warehousing activity. The downloading of objects from another database to the warehouse is performed by a warehousing node. For an object downloaded from another database, the warehousing node first determines whether the object might already be represented in the data warehouse due to a download from another database. If this might be the case, the warehousing node extracts one or more of the features of the object, fragments each of the object features into a number of feature fragments, and then hashes each of these feature fragments. A portion of each hashed feature fragment is used by the warehousing node as an addressing index by which the warehousing node transmits the hashed object feature to an index node on the network. Each index node on the network that receives a hashed object feature fragment uses the hashed object feature fragment to perform a search on its respective index database. Nodes finding data corresponding to the hashed object feature return the OIDs of the warehoused objects possessing this feature fragment. Such OIDs are then gathered by the warehousing node and a similarity function is computed. The similarity function is used to determine whether the object is already stored in the data warehouse. If the object is determined to be represented in the data warehouse, then the OID of the warehoused object is used for the downloaded object. If it is not already represented, then a unique OID is chosen for the object. The warehousing node then extracts features of the object, fragments them, and then hashes these feature fragments. A portion of each hashed feature fragment is used by the warehousing node as an addressing index by which the warehousing node transmits the hashed object feature fragment to an index node on the network where the feature is stored in the data warehouse.

Next consider the data mining activity. A user wishing to evaluate a query, such as to search for a pattern in the data, transmits a query to one of the front end computers which in turn forwards the query to one of the index nodes of the network. The node receiving the query, termed the home node of the data warehouse, decomposes the query into one or more sub-queries. A sub-query includes a feature and a computer-executable program implementing a method, e.g., a computation, which may include additional sub-queries. The home node stores them, and fragments the features of each sub-query into one or more sub-query feature fragments, and then hashes each of the feature fragments of the sub-queries. A portion of each hashed feature fragment is used by the home node as an addressing index by which the home node transmits the sub-query to a node on the network. Each index node on the network that receives a sub-query uses the hashed sub-query feature to perform a search on its respective index database. Nodes finding data corresponding to the hashed sub-query feature fragment, perform the computation specified in the sub-query. If the computation does not contain any additional sub-queries, then the results of the computation are returned to the home node. If the computation does contain additional sub-queries, then the node takes the role of the home node with respect to the sub-queries contained in the computation. In particular, the node hashes the feature fragments of the contained sub-queries and transmits the sub-queries to other nodes. This process continues recursively until the computation is complete and the final results are returned to the original home node. Upon receiving the results of the computation, the home node performs any remaining data aggregation specified by the original pattern query and transmits the information to the front end node. The front end node formats the response to the user, and transmits the formatted response to the user.

BRIEF DESCRIPTION OF THE DRAWINGS

The above and further advantages of the invention may be better understood by referring to the following description in conjunction with the accompanying drawings in which.

DETAILED DESCRIPTION OF A PREFERRED EMBODIMENT

Figure 1:
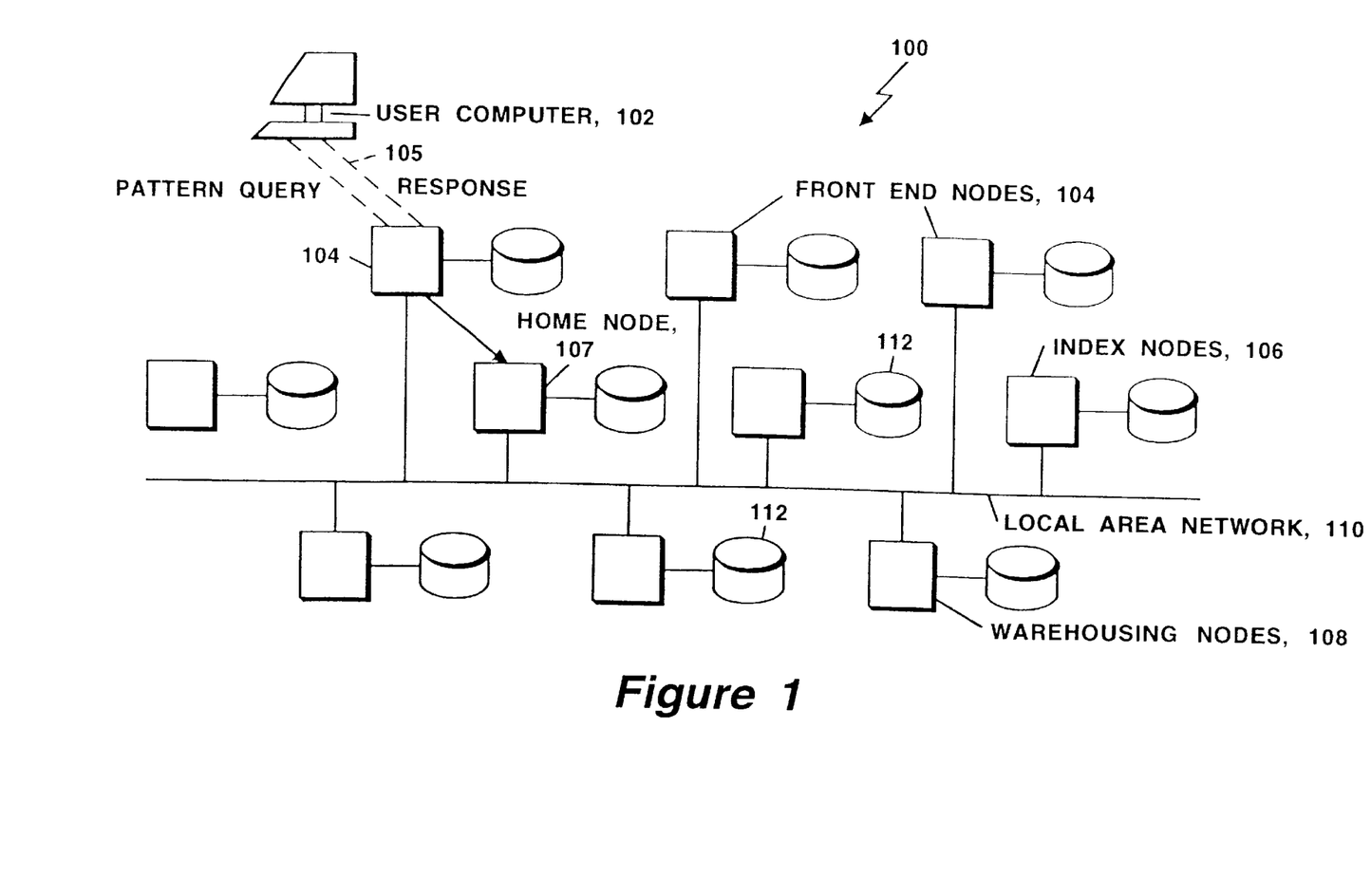
FIG. 1 is a block diagram of an embodiment of the distributed computer database system in accordance with the invention.

Referring to FIG. 1, in broad overview, one embodiment of a distributed computer database system 100 of the invention includes a user computer 102, which is in communication with a front end computer 104, e.g., through a network 106. Alternatively, the front end computer 104 may also be the user computer. The front end computer 104 is in turn in communication with a data warehouse and data mining a engine that includes one or more computer nodes 106,108 interconnected by a local area network 110. The individual computer nodes 106, 108 may include local disks 112, or may, alternatively or additionally, obtain data from a network disk server (not shown).

The computer nodes 106, 108 of the data warehouse may be of several types, including-index nodes 106 and warehousing nodes 108. The nodes 106, 108 of the data warehouse need not represent distinct computers. In one embodiment, the data warehouse is embodied as a single computer that takes on the roles of all index nodes 106 and warehousing nodes 108. In another embodiment, the data warehouse is embodied as separate computers for each index node 106 and warehousing node 108. Those skilled in the art will realize many variations are possible which will still be within the scope and spirit of the present invention.

Figure 2:
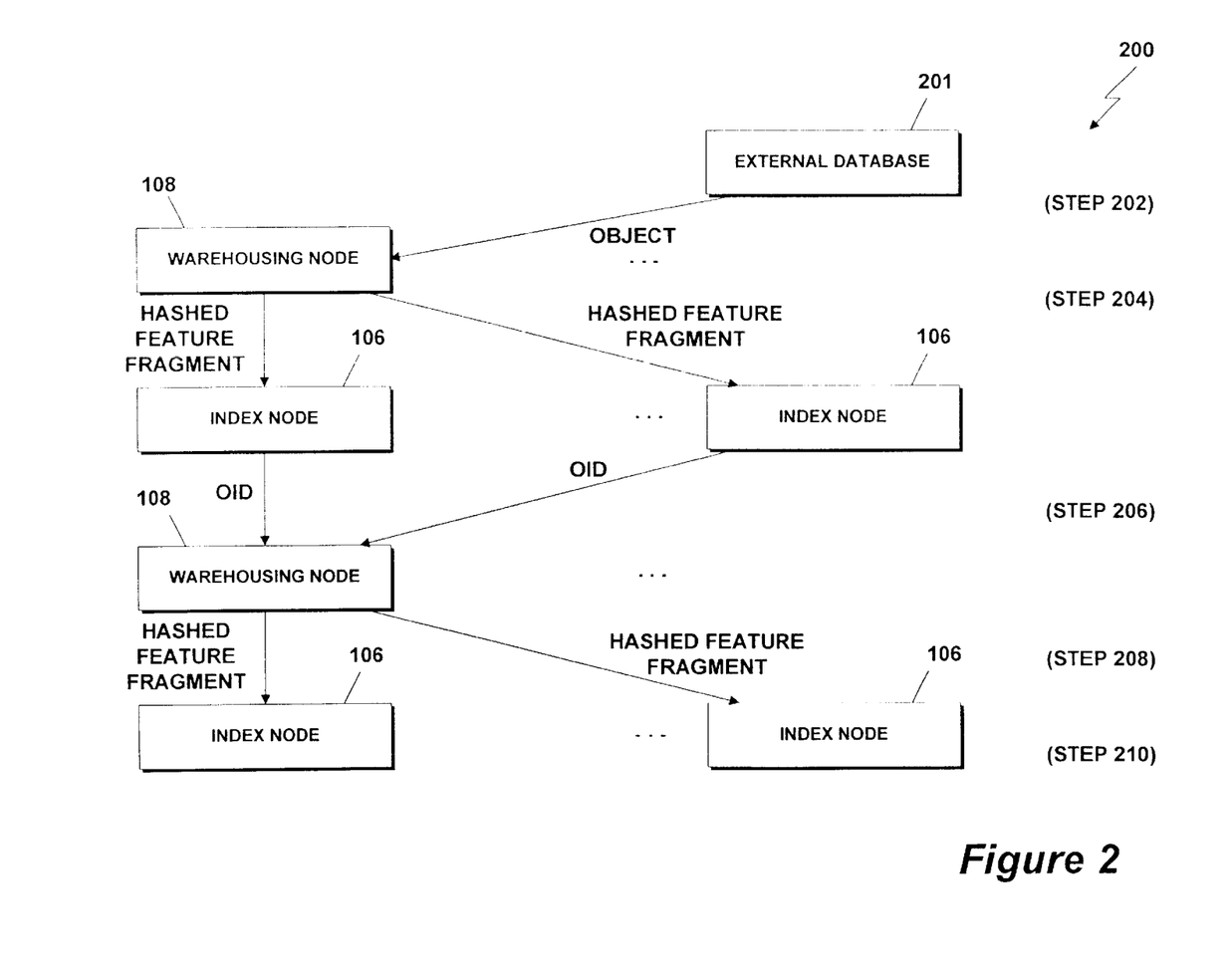
FIG. 2 is a block diagram of the distributed computer database system of FIG. 1 in flow chart form, which illustrates a method for downloading information from another source to the data warehouse in accordance with an embodiment of the invention.

Considering an exemplary method 200 of downloading objects first, and referring also to FIG. 2, in one embodiment objects are downloaded (Step 201) from an external database 201 by one or more warehousing nodes 108. If an object may already be represented in the data warehouse due to a previous download, e.g., from another database, the warehousing node 108 extracts a number of features from the object for the purpose of identifying the object, as specified in the integrated data model of the data warehouse. For example, a person can be identified by an employer "ID", account number, name, address, phone number, email address, etc. or by a combination of some of these.

A variety of feature extraction techniques can be used. For relational attribute values such as the date of a transaction, the possible values can be partitioned into a collection of contiguous, non-overlapping ranges. Partitioning field values in this way is called discretization. The actual value may also be included in the index entry.

Features are extracted from structured documents by parsing the document to produce a data structure, then dividing this data structure into (possibly overlapping) substructures, called fragments. The fragment associated with a sub-query is used to find matching fragments in the database, so it is called a probe.

Features extracted from unstructured documents are organized into a data structure including a collection of inter-related sub-structures, which are then divided into (possibly overlapping) component substructures, as in the case of a structured document, and these component substructures are the fragments of the unstructured document.

A large variety of feature extraction algorithms have been developed for media such as sound, images and video streams, for example, edge detection, segmentation. and object classification algorithms for images. Fourier and Wavelet transformations as well as many filtering algorithms are also used to extract features from images and sound. Features can also be added to an object by manual or semi-automated means.

Such added features are referred to as annotations or meta-data. Features are extracted from annotations using one of the techniques mentioned above, depending on whether the annotation is a relational database record, a structured document or an unstructured document. If a feature has values associated with it, then they may be discretized. One can also specify relationships between features. For example, one feature can be contained within another feature or be adjacent to another feature. The integrated data model specifies the feature extraction algorithms as well as the structure of the features.

The warehousing node 108 encodes each feature fragment of the object by using a predefined hashing function. Data in the system was previously stored locally on the various index nodes using this hashing function to generate an index to the data in the local database. Thus, the use of the same hashing function to generate an index for data storage and to generate hashed probes for an object assures that data is distributed uniformly over the index nodes 106 of the data warehouse during the storing of data.

In one embodiment, the hash value resulting from the use of the hashing function has a first portion that serves to identify the index node to which the data is to be sent to be stored or to which a feature fragment is to be sent as a probe. The hash value also has a second portion that is a local index value, which is used to determine the locations in memory at which data is to be stored or from which data is to be retrieved from the index node. Thus, the hashed object feature fragments are distributed (Step 202) as probes to certain index nodes 106 of the data warehouse, as determined by the first portion of the hash value.

The index nodes 106 whose probes match the hashed feature fragments by which the data was initially stored on that index node respond to a retrieval message by transmitting (Step 203) the OIDs matching the hashed feature fragments of the requested information to the warehousing node 108. Thus, all matches between the hashed probes and a local hash table of hashed feature fragments are returned or gathered to the warehousing node 108 that initially hashed the object feature fragments.

The warehousing node 108 then determines whether one of the OIDs represents the same object as the object to be warehoused. This determination is made by the warehousing node by comparing the degree of similarity between the object to be warehoused and the objects whose OIDs were returned. In one embodiment the measure of similarity is determined by the features that are common to the objects, and the features of the object to be warehoused that are not features of the object whose OID was returned.

This measure of similarity can be based on the Feature Contrast Model of Tversky (referenced above). The first term contributes a positive number to the similarity value, while the second term has a negative contribution. In addition the second term is multiplied by a predefined constant such that a feature in the second set has less effect on the similarity than one in the first set.

If the object is determined to be represented in the data warehouse, then an OID is already available for the object. If it is not already represented, then a unique OID is chosen for the object.

The warehousing node 108 then extracts all of the features of the object according to the integrated data model of the data warehouse. The feature extraction techniques were discussed above. The warehousing node 108 fragments each feature into feature fragments and encodes each feature fragment of the object by using a predefined hashing function as discussed above. In one embodiment, the hash value resulting from the use of the hashing function has a first portion which serves to identify the index node to which the data is to be sent to be stored (Step 204), and a second portion which is a local index value used to determine where data is to be stored at the index node (Step 205).

Figure 3:
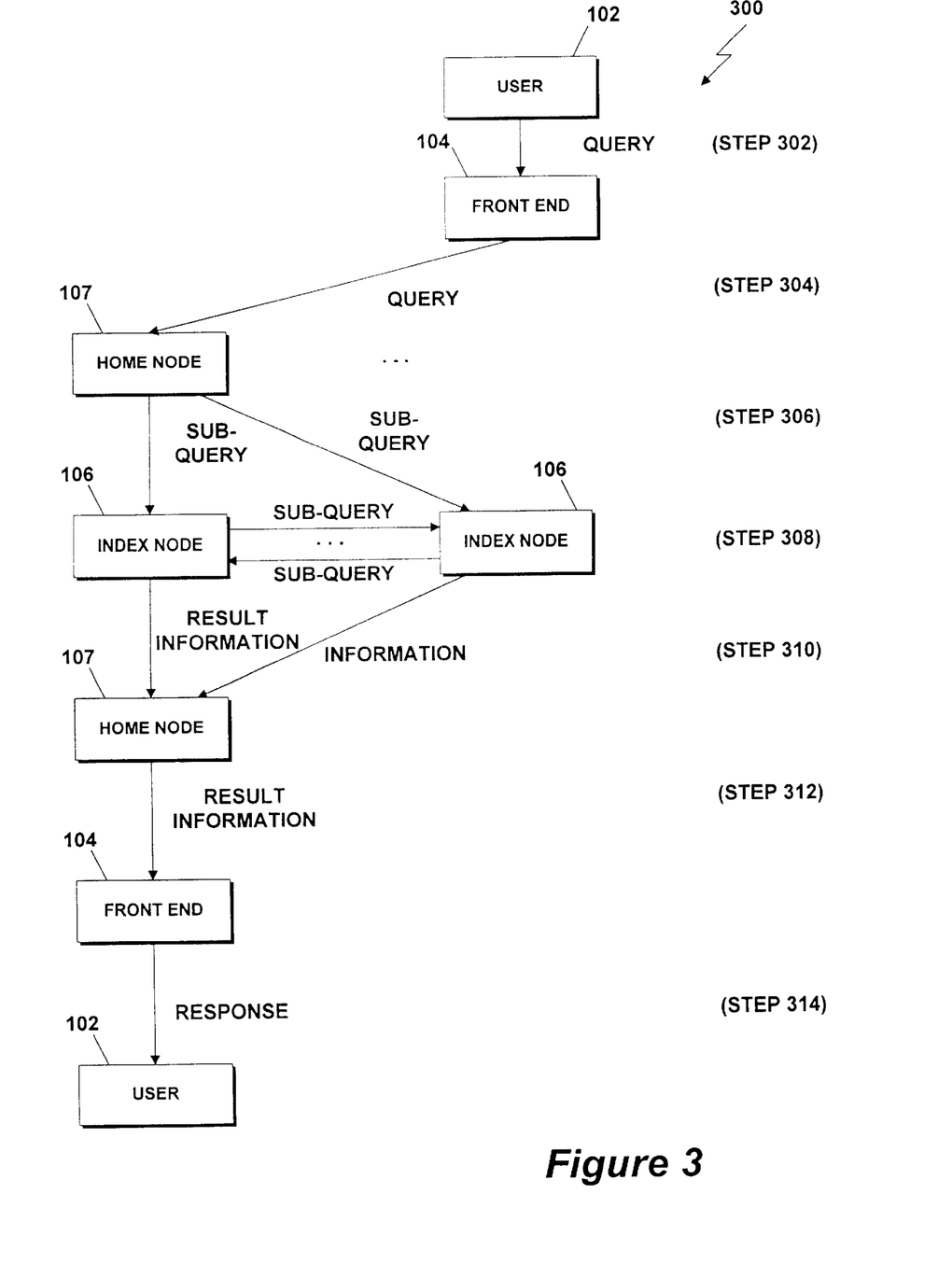
FIG. 3 is a block diagram of the distributed computer database system of FIG. 1 in flow chart form, which illustrates a method of responding to a query in accordance with an embodiment of the invention.

Considering next an exemplary method 300 for processing of a query, and referring also to FIG. 3, in one embodiment when a user transmits (Step 301) a query from the user computer 102, the front end computer 104 receives the query. The front end computer 104 is responsible for establishing the connection with the user computer 102 to enable the user to transmit a query and to receive a response in an appropriate format. The front end computer 104 is also responsible for any authentication and administrative functionality. In one embodiment, the front end computer 104 is a World Wide Web server communicating with the user computer 102 using the HTTP protocol.

After verifying that the query is acceptable, the front end computer 104 performs any reformatting necessary to make the query compatible with the requirements of the data warehouse. The front end computer 104 then transmits the query to one of the index nodes 106 of the data warehouse (Step 302), which is then defined as the home node 107 of the data warehouse for that query.

The home node 107 decomposes the query into a number (one or more) of sub-queries. Each sub-query has a feature and specifies a computer-executable method, e.g., a computation. The computation determines what action the sub-query is to perform. The most common computations are statistical functions that aggregate information stored in the data warehouse. Computations can include similarity criteria such as the minimum strength required to accept a match, and statistical computations such as the average or standard deviation. The computation may contain additional sub-queries.

For each sub-query, the home node 107 fragments the sub-query feature into sub-query feature fragments, and encodes the feature fragment by using a predefined hashing function, as described above. The hashed feature fragment and sub-query are transmitted by the home node to an index node (Step 303) using the hashed feature fragment as described above.

Index nodes 106 whose hashed feature fragments match the index feature fragments by which the data was initially stored on that index node respond to the sub-query by retrieving data in the local hash table of index terms that match the hashed feature fragment and by performing the computation specified in the sub-query. If the computation contains any additional sub-queries, then the index node acts as the home node for a new query, called a component sub-query, which is processed as described above (Step 304). For example, a sub-query could be used to find other product sales that are correlated with each customer who purchased an appliance in the last month. Whether the computation contains additional sub-queries or not, the index node returns the results of its computation to the home node 107 of the sub-query that it received (Step 305).

When the results of all the sub-queries of the original query have been received, the home node 107 performs any data aggregation, such as, e.g., computing the average or standard deviation, specified by the original query and returns the resulting information to the user. In one embodiment the returned information is transmitted to the front end computer 104 (Step 306), which formats the response appropriately and transmits the response to the user (Step 307). In another embodiment the information to be returned is transmitted directly to the user computer 102, e.g., by way of the network 105 without intervention of the front end computer 104.

Figure 4A:
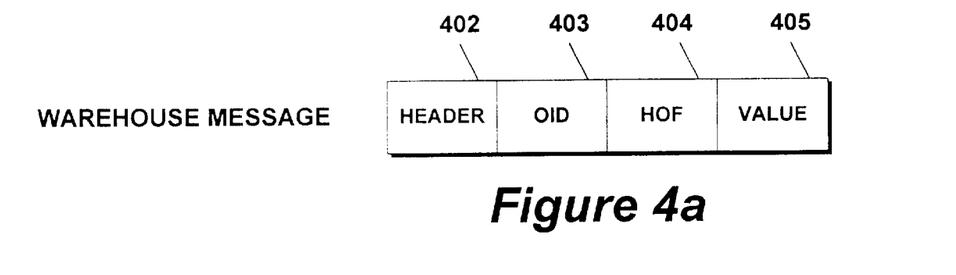
FIG. 4a–FIG.4e are block diagrams showing formats for a warehouse message, warehouse response message, insert message, sub-query message, and sub-query response message, respectively, as may be used in conjunction with the embodiment of FIGS. 1–3.
Figure 5:
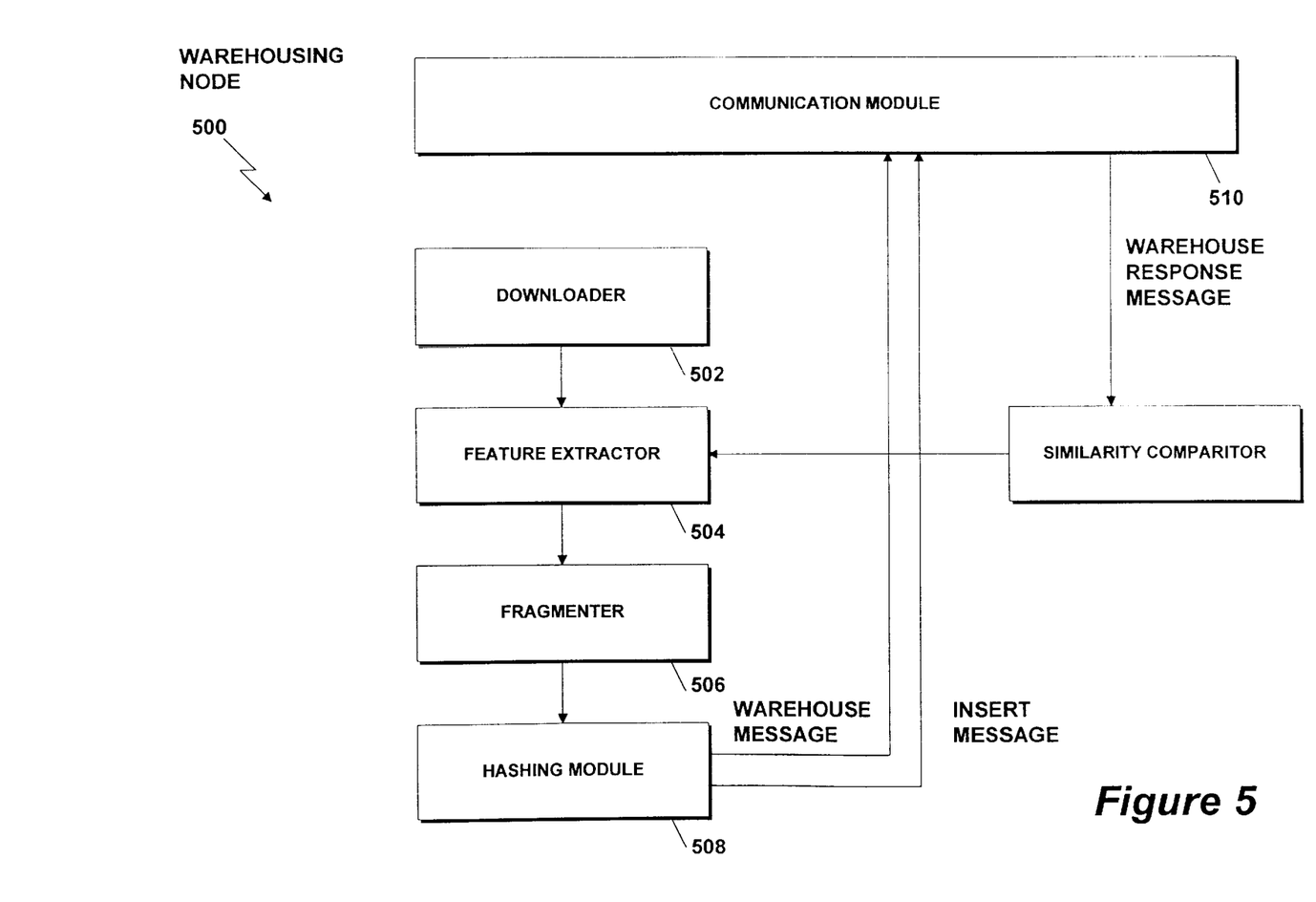
FIG. 5 is a block diagram of a representative one of the home nodes of FIGS. 1–3 in accordance with an embodiment of the invention.

Considering next the message formats used in the preferred embodiment, and referring to FIG. 4a, an exemplary format for a Warehouse Message contains four fields: Header 402, Object Identifier (QID) 403, Hashed Object Fragment (HOF) 404, and Value 405. The Header field 402 specifies that this message is a Warehouse Message and also specifies the destination index node. The destination index node is determined by the first portion of the hashed object fragment. The OID field 403 contains an object type specifier and an object identifier. The HOF field 404 contains a fragment type specifier and the second portion of the hashed object fragment produced by the Hashing Module (FIG. 5). The Value field 405 contains an optional value associated with the fragment. The fragment type specifier determines whether the Warehouse Message contains a Value field 405, and if the Warehouse Message does contain a Value field then the fragment type specifier determines the size of the Value field.

Figure 4B:
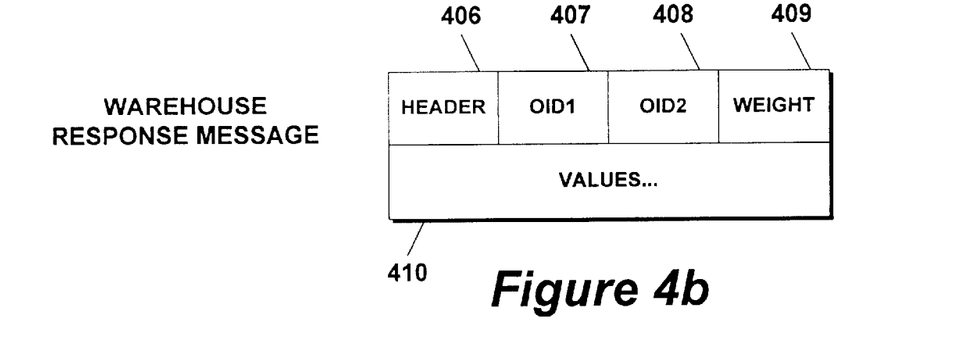

Referring to FIG. 4b, an exemplary format of a Warehouse Response Message has two parts: Identifier and Values. The Identifier part has four fields: Header 406, OID1 407, OID2 408, and Weight 409. The Header field 406 specifies that this message is a Warehouse Response Message and also specifies the destination warehouse node. The destination warehouse node is the warehouse node from which the corresponding Warehouse Message was received. The two OID fields 407, 408 contain an object type specifier and an object identifier. The first OID field 407 is the same as the OID field 403 of the corresponding Warehouse Message. The second OID field 408 identifies an object that-has been previously indexed. The Weight field 409 contains an optional weight associated with the object identified by OID1 407. The object type specifier of OID1 determines whether the Warehouse Response Message contains a Weight field, and if the Warehouse Response Message does contain a Weight field then the object type specifier of OID1 determines the size of the field. The Values part of the Warehouse Response Message contains a number of fields 410 for containing data associated with the object identified by OID2 408. The structure and size of the Values part is determined by the object type specifier of OID2.

Figure 4C:
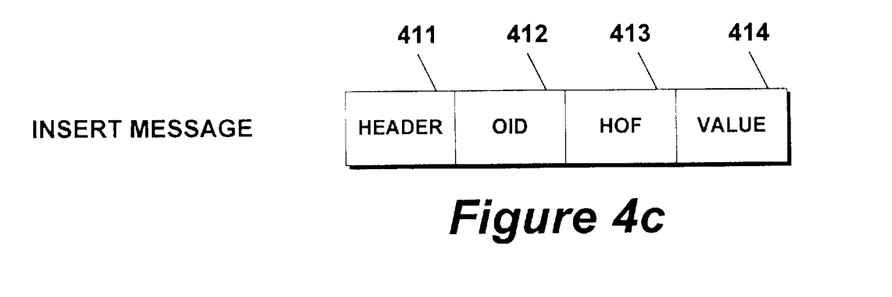

Referring to FIG. 4c, an exemplary format for an Insert Message has four fields: Header 411, OID 412, HOF 413, and Value 414. The Header field 414 specifies that this message is an Insert Message and also specifies the destination index node. The destination index node is determined by the first portion of the hashed object fragment. The OID field 412 contains an object type specifier and the object identifier. The HOF field 413 contains a fragment type specifier and the second portion of the hashed object fragment produced by the Hashing Module (FIG. 5). The Value field 414 contains an optional value associated with the fragment. The fragment type specifier determines whether the Insert Message contains a Value field 414, and if the Insert Message does contain a Value field then the fragment type specifier determines the size of the Value field.

Figure 4D:
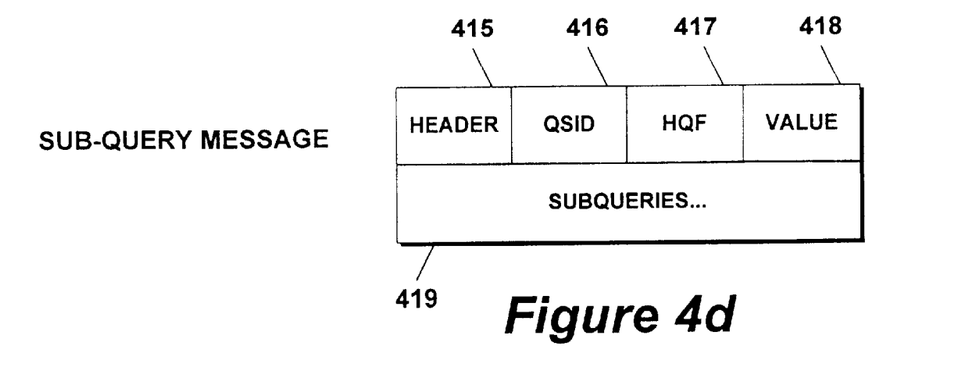

Referring to FIG. 4d, an exemplary format for a Sub-Query Message has two parts: Identifier and Subqueries. The Identifier part has four fields: Header 415, Sub-Query Identifier (QSID) 416, Hashed Query Fragment (HQF) 417, and Value.418. The Header field 415 specifies that this message is a Sub-Query Message and also specifies the destination index node. The destination index node is determined by the first portion of the hashed query fragment. The QSID field 416 contains a query type specifier and a sub-query identifier. The HQF field 417 contains a fragment type specifier and the second portion of the hashed sub-query fragment produced by the Hashing Module (FIG. 5). The Value field 418 contains an optional value associated with 10 the fragment. The fragment type specifier determines whether the Sub-Query Message contains a Value field 418, and if the Sub-Query Message does contain a Value field then the fragment type specifier determines the size of the Value field. The Subqueries part of the Sub-Query Message contains a number of subqueries. A Sub-Query Message having no subqueries is called a Simple Sub-Query Message.

Figure 4E:
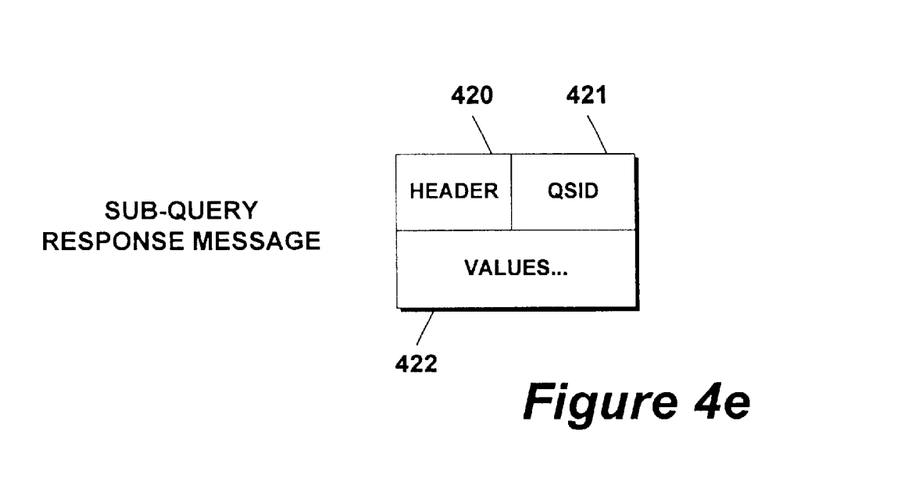

Referring to FIG. 4e, an exemplary embodiment for a Sub-Query Response Message has two parts: Identifier and Values. The Identifier part has two fields: Header 420 and QSID 421. The Header field 420 specifies that this message is a Sub-Query Response Message and also specifies the destination index node. The destination index node is the same as the the index node from which the corresponding Sub-Query Message was received. The QSID field 421 contains a query type specifier and a subquery identifier. The Values part of the Sub-Query Response Message has a number of fields 422 for containing the result data of the sub-query. The structure of the Values part is specified by the query type identifier.

Each node of the distributed computer system includes a Communication Module, discussed below and shown in FIGS. 5 and 6 responsible for transmitting and receiving messages from one node to another. Transmission of a message requires (1) enqueuing of the message prior to transmission over the communication medium, (2) actual transmission over the communication medium, and (3) enqueuing a task to process the message when the message is received by the module determined by the message type. The message type determines the command that is issued to the receiving module. The command determines the means by which the message is to be processed by the module. The destination node for a message to be transmitted is specified in the Header field of each message. When a message is received from another node, the type of message determines which module will process the message. The message type is specified in the Header field of each message. The Communication Module of a home node is also responsible for communication with the Front End nodes. A Front End node transmits queries to the home node, and the home node transmits results, such as graphs and formatted tables, to the Front End node.

Considering next exemplary embodiments of the nodes discussed above, and also referring to FIG. 5, a warehousing node 500 can have a Downloader 502 that scans external databases to download objects for warehousing and indexing by the knowledge extraction engine. Each warehousing node 500 may have a different type of Downloader 502. For example, one type of Downloader can download data from relational databases using a standard SQL protocol such as ODBC or a proprietary protocol defined by one of the relational database vendors. Downloading in this case is performed using one or more SQL queries. For another example, the Downloader can be an Information and Content Exchange (ICE) subscriber that negotiates to obtain content from syndicators over the Internet. This is a preferred mechanism for obtaining time-sensitive content such as news feeds. The Downloader 502 transfers objects to a Feature Extractor 504.

The Feature Extractor 504 extracts features from an object. If the object is a relational database record, then feature extraction includes steps such as selecting the fields that will be indexed, reformatting fields and eliminating or correcting data that is determined to be erroneous. Feature extraction for images is performed by detecting edges, identifying the image objects, and determining relationships between image objects. In another embodiment, feature extraction for images is performed by computing Fourier or wavelet transforms. Each Fourier or wavelet transform constitutes one extracted feature. Features are indexed by using a number of Insert Messages.

The Feature Extractor 504 also maps each object identifier in an external database to an object identifier of the knowledge extraction engine. Each external database can have its own mechanism for assigning object identifiers, and features of the same object may be stored in each external database with a different object identifier. For example, one external database might use a social security number. Another external database might use an employee identifier. The mapping from external object identifiers is achieved by using a number of Warehouse Messages.

A Fragmenter 506 computes the fragments contained in each feature. Each fragment includes of a bounded set of related components in the feature. In one embodiment, the fragments of a feature include each attribute and each relationship in the data structure defining the feature. For an object in the form of a relational database record, the features are the attributes that were selected, reformatted and corrected by the Feature Extractor 504. The fragments are transferred to the Hashing Module.

A Hashing Module 508 computes a hash function of a fragment. In one embodiment, the hash function is the MD4 Message Digest algorithm, as set forth in a specification, Request for Comment (RFC) 1186, published by the Network Working Group of the Internet Engineering Task Force, October, 1990, and available over the Internet or from R. Rivest at the MIT Laboratory for Computer Science, Cambridge, Mass., USA. The Hashing Module 508 transfers either a Warehouse Message or an Insert Message to a Communication Module 510, depending on whether the purpose of the fragment is to achieve an object identifier mapping or to index an object feature, respectively.

A Similarity Comparator 512 receives Warehouse Response Messages from the Communication Module 510, and produces Insert Messages, which are transferred to the Communication Module 510. The Similarity Comparator 512 gathers all the warehouse responses for an object whose identifier is being mapped. For each object in the responses, the Similarity Comparator 512 determines the relevance of each object identifier returned in the search. This determination of relevance is made by the warehousing node by comparing the degree of similarity between the object whose identifier is being mapped and the objects whose OIDs were returned. In one embodiment the measure of similarity between the query and the object is a cosine measure and is given by the expression $COS(v,w)$, where the vector v denotes the query and the vector w denotes the object. These vectors are in a space in which each fragment represents one dimension of the space. If a compatible OID is found, then the OID will be used as the mapped object identifier, and the OID is transferred to the Feature Extractor 504. If no compatible OID is found, then a new object identifier is chosen and transferred to the Feature Extractor 504.

Figure 6:
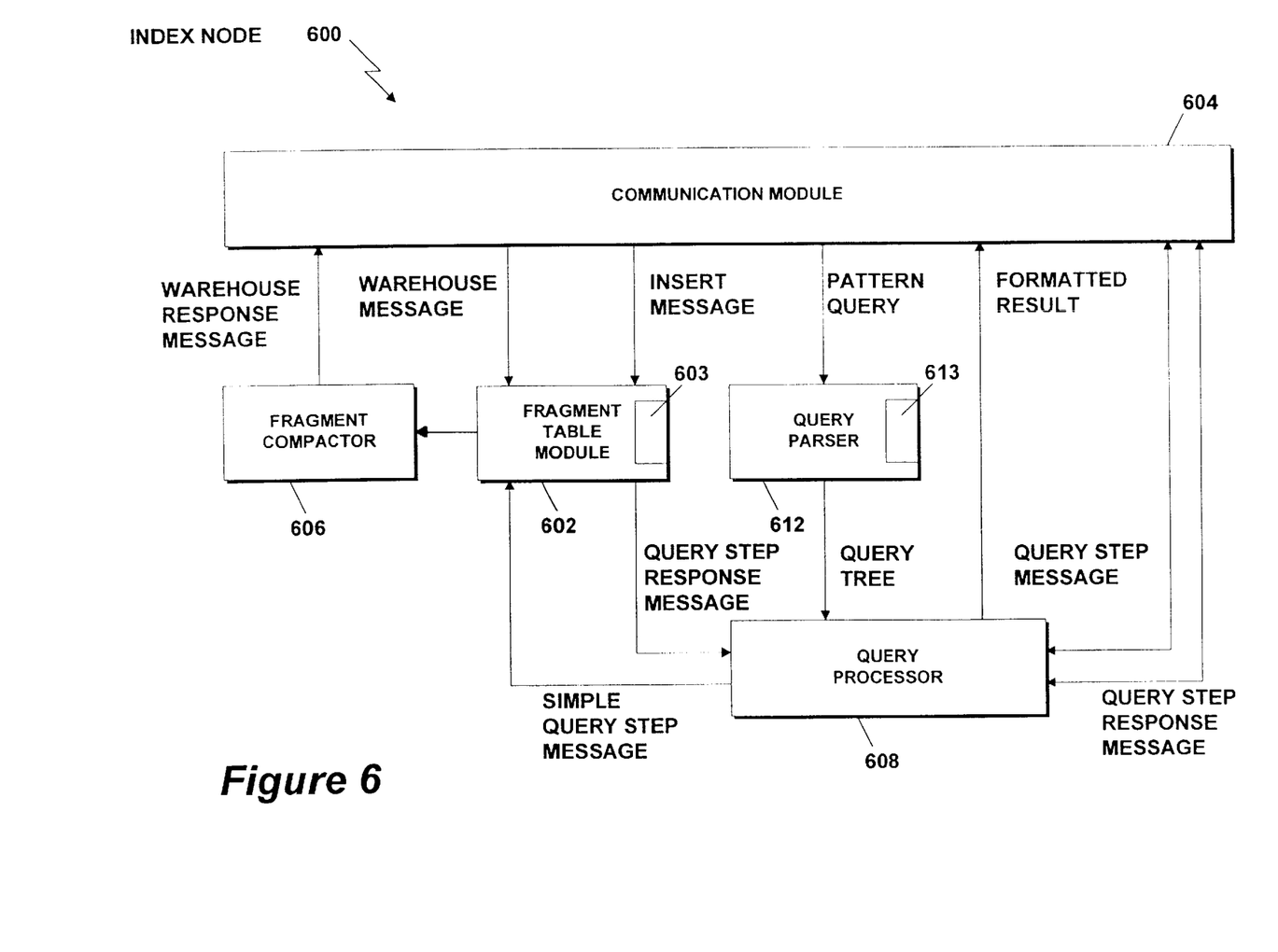
FIG. 6 is a block diagram of a representative one of the index nodes of FIGS. 1–3 in accordance with an embodiment of the invention.

Referring now to FIG. 6, an index node 600 can have a Fragment Table Module 602 that receives Warehouse Messages, Insert Messages and Simple Sub-Query Messages from a Communication Module 604. In the case of a Warehouse Message, the Fragment Table Module 602 retrieves an entry in a local hash table 603 using the hash value in the HOF field. The type specifier in the HOF field and the entry in the local hash table are transferred to a Fragment Comparator 606. In the case of a Simple Sub-Query Message, the Fragment Table Module 602 retrieves an entry in the local hash table 603 using the hash value in the HQF field. The entry in the local hash table 603 is returned to a Query Processor 608 using a Sub-Query Response Message. In the case of an Insert Message, the Fragment Table Module 602 modifies an entry in the local hash table 603 by adding the OID and Value fields of the Insert Message to the entry in the local hash table 603.

The Fragment Comparator 606 receives entries from the Fragment Table Module 602. A comparison function is determined by the HOF type specifier that was transferred from the Fragment Table Module 602. The comparison function is used to determine the relevance of the OID and Value fields in the entry that was transferred from the Fragment Table Module 602. In one embodiment, the comparison function determines a similarity weight, and the OIDs having the highest similarity weight are deemed to be relevant. The relevant OIDs and their similarity weights are transferred to the Communication Module 604 using a Warehouse Response Message.

A Query Parser 612 parses a query into a query computation tree stored in memory 613, which is a data structure specified in terms of a number of nodes and their interrelationships. The nodes of the query computation tree are either internal nodes or leaf nodes. An internal node is a node having one or more child nodes. An internal node specifies how the results of the child nodes are to be combined. For example, the results could be summed or averaged, or used to compute the standard deviation. A leaf node is a node having no children. A leaf node is either a constant value or a simple sub-query node. A sub-query node can have a number of component subqueries. Each component sub-query is also specified using a corresponding query computation tree. The query computation trees are transferred to the Query Processor 608.

The Query Processor 608 is responsible for administering the processing of queries. Upon receiving a query computation tree from the Query Parser, it assigns a query identifier (QID) to the query, and it assigns a sub-query identifier (QSID) to each leaf node that specifies a sub-query. A sub-query that has no component subqueries is called a simple sub-query. A sub-query is processed by transmitting a Sub-Query Message to the specified index node by means of the Communication Module 604. The Query Processor 608 at the specified destination index node processes the Sub-Query Message by transferring a Simple Sub-Query Message to the Fragment Table Module 602, which responds with a Sub-Query Response Message. The Query Processor 608 then sends the Sub-Query Response Message to the index node that originally sent the Sub-Query Message. As a result, the Query Processor 608 both sends and receives Sub-Query Messages and Sub-Query Response Messages. As Sub-Query Response Messages are received, processing specified in the query computation tree is performed. When a sub-query has a component sub-query, the sub-query requires the processing of additional sub-queries. When the entire query (including all its sub-queries and their sub-queries, etc., called "nested sub-queries") has been computed, the results are formatted and transmitted to the front end from which the query was received. For example, the results may be given as a graph or table. Accordingly, since each query or nested sub-query is associated with a level within the tree, the query processor 608 is responsible for processing queries of all levels within the tree.

Figure 7:
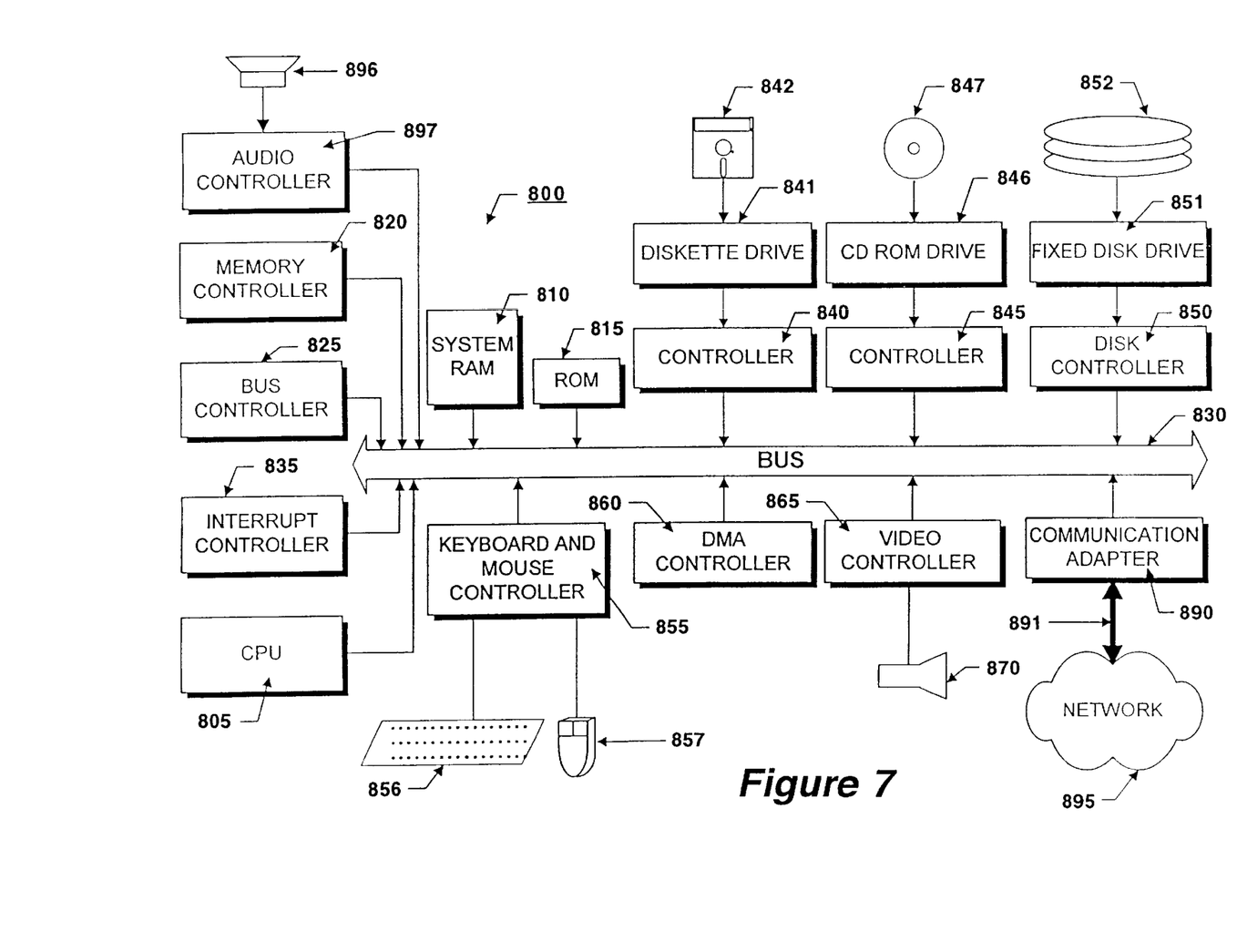
FIG. 7 is a block diagram of a computer system in accordance with an exemplary embodiment of each of the user computer, index nodes and warehousing nodes.

FIG. 7 illustrates a conventional system architecture for an exemplary computer system 800. Each of the user computer, front end computer and the computer nodes, including indexing and warehousing nodes, can be implemented as an instance of computer system 800. The exemplary computer system of FIG. 7 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 7.

The computer system 800 includes a central processing unit (CPU) 805, which may include a conventional microprocessor, random access memory (RAM) 810 for temporary storage of information, and read only memory (ROM) 815 for permanent storage of information. A memory controller 820 is provided for controlling system RAM 810. A bus controller 825 is provided for controlling bus 830, and an interrupt controller 835 is used for receiving and processing various interrupt signals from the other system components.

Mass storage may be provided by diskette 842, CD-ROM 847, or hard disk 852. Data and software may be exchanged with client computer 800 via removable media, such as diskette 842 and CD-ROM 847. Diskette 842 is insertable into diskette drive 841, which is connected to bus 830 by controller 840. Similarly, CD-ROM 847 is insertable into CD-ROM drive 846, which is connected to bus 830 by controller 845. Finally, the hard disk 852 is part of a fixed disk drive 851, which is connected to bus 830 by controller 850.

User input to the computer system 800 may be provided by a number of devices. For example, a keyboard 856 and a mouse 857 may be connected to bus 830 by keyboard and mouse controller 855. An audio transducer 896, which may act as both a microphone and a speaker, is connected to bus 830 by audio controller 897. It should be obvious to those reasonably skilled in the art that other input devices, such as a pen, and/or tablet and a microphone for voice input, may be connected to client computer 800 through bus 830 and an appropriate controller. DMA controller 860 is provided for performing direct memory access to system RAM 810. A visual display is generated by a video controller 865, which controls video display 870;

Computer system 800 also includes a network adapter 890 that allows the client computer 800 to be interconnected to a network 895 via a bus 891. The network 895, which may be a local area network (LAN), a wide area network (WAN), or the Internet, may utilize general-purpose communication lines that interconnect multiple network devices.

Computer system 800 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readiable, media, e.g. the diskette 842, CD-ROM 847, ROM 815, or fixed disk 852 of FIG. 7 or transmittable via a modem or other interface device, such as communications adapter 890 connected to the network 895 over a medium 891. Medium 891 can be either a tangible medium, including but not limited to optical or hard-wire communications lines, or may be implemented with wireless techniques, including but not limited to microwave, infrared or other transmission techniques. It may also be the Internet. When so transmitted, the software components can take the form of a digital signal embodied in a carrier wave. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims. Therefore, the invention should be construed as limited only as indicated by the scope of the claims.

What is claimed is:

1. A method of warehousing objects or locations of objects in a manner which is conducive to knowledge extraction using queries in a distributed computer database system having a number of index nodes and a number of warehousing nodes connected by a network, said method comprising the steps of:

A) extracting, by a warehousing node, a first number of features from an object downloaded from another database;

B) fragmenting each of the extracted object features into a number of object feature fragments;

C) hashing, by said warehousing node, each of said object feature fragments of said first number of object features, each said hashed object feature fragment having a first portion and a second portion;

D) transmitting, by said warehousing node, each said hashed object feature fragment of said first number of feature fragments to a respective one of said number of index nodes indicated by said first portion of each said hashed object feature;

E) using, by said index node, said second portion of said respective hashed object feature fragment to access data according to a local hash table located on said index node;

F) returning, by each said index node accessing data according to said respective hashed object feature fragment, a number of object identifiers corresponding to said accessed data to said warehousing node;

G) determining, by said warehousing node, whether the said object is to be assigned an object identifier from the said number of object identifiers, or the said object is to be assigned an object identifier that is not yet in use;

H) assigning, by said warehousing node, an object identifier to the said object according to the said determination;

I) extracting, by said warehousing node, a second number of features from said object;

J) fragmenting each of said extracted second number of object features into a number of object feature fragments;

K) hashing, by said warehousing node, each said object feature fragment of said second number of object features, said hashed object feature fragment having a first portion and a second portion;

L) transmitting, by said warehousing node, each said hashed object feature fragment of said second number of feature fragments to a respective one of said number of index nodes indicated by said first portion of each said hashed object feature fragment; and M) using, by said index node, said second portion of said respective hashed object feature fragment to store data according to a local hash table located on said index node.

2. The method of claim 1 further comprising the step of determining, by said warehousing node, a measure of similarity between said accessed data and said object; subsequent to the step of returning said first number of object identifiers.

3. The method of claim 2 wherein said measure of similarity is determined by a similarity function based on features possessed by both the said accessed data and the said object; and features possessed only by the said object.

4. A method for data mining using queries in a distributed computer databae system having a number of index nodes connected by a network, said method comprising the steps of:

A) selecting a first one of said number of index nodes, herein termed the home node of the query;

B) extracting, by said home node, a number of sub-queries from a query by a user, each said sub-query including a feature, a number of sub-queries and a computation specification;

C) fragmenting each of said sub-query features into a number of sub-query feature fragments;

D) hashing, by said home node, each said sub-query feature fragment of each said sub-query feature fragments, each said hashed sub-query feature fragment having a first portion and a second portion;

E) transmitting, by said home node, each said hashed sub-query feature fragment to a respective one of said number of index nodes indicated by said first portion of each said hashed sub-query feature fragment;

F) using, by said index node, said second portion of said respective hashed sub-query feature fragment to access data according to a local hash table located on said index node;

G) recursively evaluating, by said index node, each sub-query of said number of sub-queries contained in said respective sub-query transmitted by said home node, said index node acting as the home node of said sub-query of said number of sub-queries;

H) computing, by said index node, information according to said computation specification of said respective sub-query transmitted by said home node, according to said accessed data and information determined by said recursive evaluation of each said sub-query of said number of sub-queries contained in said respective sub-query transmitted by said home node; and I) returning, by each said index node, said information to said home node.

5. The method of claim 4 further comprising the step of receiving, at said home node, said query from said user, prior to the step of extracting sub-queries from said query.

6. A distributed computer database system for warehousing of information objects or locations of information objects, comprising A) a number of warehousing nodes and a number of index nodes, said number of warehousing nodes and said number of index nodes connected by a network, B) wherein each said warehousing node, upon downloading an object, extracts a first number of features from said object, fragments each said object feature into an object feature fragment, hashes each said object feature fragment into a hashed object feature fragment having a first portion and a second portion, and transmits each said hashed object feature fragment to a respective one of said number of index nodes indicated by said first portion of said hashed object feature fragment, C) wherein each said index node uses said second portion of said hashed object feature fragment to access data according to a local hash table located on said index node, returning a number of object identifiers corresponding to said accessed data to said warehousing node, D) wherein said warehousing assigns to said object either one of said object identifiers of said number of object identifiers or an object identifier that is not yet in use, extracts a second number of features from said object, fragments each said extracted feature of said second number of features into a number of object feature fragments; hashes each said object feature fragment of said second number of object features into a hashed object feature having a first portion and a second portion, and transmits each said hashed object feature fragment to a respective one of said number of index nodes indicated by said first portion of said hashed object feature fragment, and E) wherein each said index node uses said second portion of said hashed object feature fragment to store objects or locations of objects according to a local hash table located on said index node.

7. The distributed computer database system of claim 6 wherein said warehousing node determines a measure of similarity between said accessed data and said object for use in assigning an object identifier to said object.

8. The method of claim 7 wherein said warehousing node measures similarity using a similarity function determined by features possessed by both the said accessed data and the said object; and features possessed only by the said object.

9. A distributed computer database system having a data mining tool for handling queries from a user comprising:
   A) a number of index nodes connected by a network;
   B) wherein each said index node, upon receiving a query from a user, and termed the home node of said query, extracts a number of sub-queries from said query and a number of features from each said sub-query, fragments each said sub-query feature into a number of sub-query feature fragments; hashes the sub-query feature of said number of sub-queries into a hashed sub-query feature having a first portion and a second portion, and transmits each said hashed sub-query feature fragment to a respective one of said number of index nodes indicated by said first portion of said hashed sub-query feature fragment, and
   C) further wherein each said index node uses said second portion of said hashed sub-query feature fragment to access data according to a local hash table located on said index node, recursively evaluates each sub-query contained in said respective sub-query, computes information according to said accessed data and information determined by said recursive evaluation, and returns said information to said home node.

10. A distributed computer database system for warehousing and data mining, comprising:
   A) a number of warehousing nodes, and a number of index nodes, said number of warehousing nodes and said number of index nodes connected by a network,
   B) each said warehousing node, upon receiving a download command, enqueuing a predetermined task in response to said download command,
   C) a download task enqueued, in response to a download command, extracting a first number of features from an object downloaded by said download command, fragmenting each said object feature into a number of object feature fragments; hashing each said object feature fragment of said first number of object features into a hashed object feature fragment having a first portion and a second portion, and transmitting a retrieve message containing each said hashed object feature fragment to a respective one of said number of index nodes indicated by said first portion of said hashed object feature fragment,
   D) said index node, upon receipt of said retrieve message, using said second portion of said hashed object feature fragment to access data according to a local hash table located on said index node and transmitting a message returning a number of object identifiers corresponding to said accessed data to said warehousing node,
   E) said warehousing node, upon receipt of said number of object identifiers from said number of index nodes, assigning to said object either one of said object identifiers of said number of object identifiers or an object identifier that is not yet in use, extracting a second number of features from said object, fragementing each said object feature of said second number of object features into a number of object feature fragments; hashing each said object feature fragment of said second number of object feature fragments into a hashed object feature fragment having a first portion and a second portion, and transmitting an insert message containing each said hashed object feature fragment to a respective one of said number of index nodes indicated by said first portion of said hashed object feature fragment, and
   F) said index node, upon receipt of said insert message, using said second portion of said hashed object feature fragment to store data according to a local hash table located on said index node.

11. The distributed computer database system of claim 10 wherein said warehousing node determines a measure of similarity between said accessed data and said object for use in assigning an object identifier to said object.

12. The method of claim 11 wherein said warehousing node measures similarity using a similarity function determined by: features possessed by both the said accessed data and the said object, and features possessed only by the said object.

13. A distributed computer database system having a data mining tool for handling queries from a user, comprising;
   A) a number of index nodes connected by a network,
   B) each said index node, upon receiving a command from a user, said index node termed the home node of the command, enqueuing a predetermined task in response to said command,
   C) a query task enqueued being resultant in, in response to a query command from said user, extracting a number of sub-queries from a query contained in said query command and a number of features from each said extracted sub-query, fragmenting each said sub-query feature into a number of sub-query feature fragments; hashing each said sub-query feature fragment into a hashed sub-query feature fragment having a first portion and a second portion, and transmitting a sub-query message containing each said hashed sub-query feature fragment to a respective one of said number of index nodes indicated by said first portion of said hashed sub-query feature fragment, and
   D) said index-node, upon receipt of said sub-query message, using said second portion of said hashed sub-query feature fragment to access data according to a local hash table located on said index node recursively evaluating each sub-query contained in said respective sub-query, computing information according to said accessed data and information determined by said recursive evaluation, and transmitting a message returning said information to said home node.

14. The method of claim 13 wherein said query message requests predetermined data from said index node in response to a query contained in said query command from said user.

15. An information retrieval apparatus for processing a query for retrieval of information from a database, comprising:
   A) a mechanism for locating a number of features and feature fragments in an index;
   B) an evaluating mechanism coupled with the locating mechanism identifying a number of sub-queries of a number of levels contained in the query and recursively evaluating the sub-queries using each of the located features and feature fragments; and
   C) a mechanism coupled with the evaluating mechanism for collecting and storing in a memory a number of results of the recursive evaluation of the query and sub-queries pursuant to computing an overall result of the query.

16. An method for processing a query for retrieval of information from a database, comprising:
   A) locating a number of features and feature fragments in an index;

B) identifying a number of sub-queries of a number of levels contained in the query and recursively evaluating the sub-queries using each of the located features and feature fragments; and C) collecting and storing a number of results of the recursive evaluation of the query and sub-queries pursuant to computing an overall result of the query.

17. A computer program product for processing a query for retrieval of information from a database, the computer program product comprising a computer-executable program embodied on a computer-readable medium, the computer-executable program comprising:

A) first code portion for locating a number of features and feature fragments in an index;

B) second code portion for identifying a number of sub-queries of a number of levels contained in the query and recursively evaluating the sub-queries using each of the located features and feature fragments; and C) a third code portion for collecting and storing a number of results of the recursive evaluation of the query and sub-queries pursuant to computing an overall result of the query.

* * * * *